United States Patent
Toomey

(10) Patent No.: US 7,188,359 B2
(45) Date of Patent: Mar. 6, 2007

(54) OPTIMIZING AUTHENTICATION SERVICE AVAILABILITY AND RESPONSIVENESS VIA CLIENT-SIDE ROUTING

(75) Inventor: Christopher Newell Toomey, Cupertino, CA (US)

(73) Assignee: America Online, Inc., Dulles, VA (US)

( * ) Notice: Subject to any disclaimer, the term of this patent is extended or adjusted under 35 U.S.C. 154(b) by 209 days.

(21) Appl. No.: 10/323,243

(22) Filed: Dec. 18, 2002

(65) Prior Publication Data

US 2004/0123140 A1   Jun. 24, 2004

(51) Int. Cl.
*H04L 9/32* (2006.01)
*G06F 15/16* (2006.01)

(52) U.S. Cl. .............................. 726/3; 726/2; 709/225; 709/229

(58) Field of Classification Search ................ 713/201, 713/200, 202; 709/225, 229; 726/2, 3
See application file for complete search history.

(56) References Cited

U.S. PATENT DOCUMENTS

| | | | |
|---|---|---|---|
| 4,218,738 A | 8/1980 | Matyas et al. ............... 364/200 |
| 5,884,312 A | 3/1999 | Dutsan et al. ................ 707/10 |
| 5,892,905 A | 4/1999 | Brandt et al. .......... 395/187.01 |
| 5,999,973 A | 12/1999 | Glitho et al. ................ 709/223 |
| 6,012,090 A * | 1/2000 | Chung et al. ............... 709/219 |
| 6,078,960 A * | 6/2000 | Ballard ........................ 709/229 |
| 6,104,392 A | 8/2000 | Shaw et al. .................. 345/335 |
| 6,151,599 A | 11/2000 | Shrader et al. ................ 707/9 |
| 6,173,406 B1 | 1/2001 | Wang et al. ................. 713/201 |
| 6,175,869 B1 * | 1/2001 | Ahuja et al. ................. 709/226 |
| 6,182,142 B1 | 1/2001 | Win et al. .................... 709/229 |
| 6,223,292 B1 | 4/2001 | Dean et al. .................. 713/202 |
| 6,226,749 B1 | 5/2001 | Carloganu et al. .......... 713/201 |
| 6,324,648 B1 * | 11/2001 | Grantges, Jr. ............... 713/201 |
| 6,332,163 B1 | 12/2001 | Bowman-Amuah ......... 709/231 |
| 6,334,190 B1 | 12/2001 | Silverbrook et al. ........ 713/500 |
| 6,339,832 B1 | 1/2002 | Bowman-Amuah .......... 714/35 |
| 6,341,316 B1 | 1/2002 | Kloba et al. ................. 709/248 |
| 6,341,353 B1 | 1/2002 | Herman et al. ............. 713/201 |
| 6,374,354 B1 | 4/2002 | Walmsley et al. .......... 713/167 |

(Continued)

FOREIGN PATENT DOCUMENTS

EP   774 845   5/1997

(Continued)

OTHER PUBLICATIONS

Yoshikawa et al.; "Using Smart Clients to Build Scalable Services"; Proceedings of the USENIX Annual Technical Conference, Jan. 6-10, 1997; pp. 105-118.*

(Continued)

*Primary Examiner*—Gilberto Barron
*Assistant Examiner*—Jung Kim
(74) *Attorney, Agent, or Firm*—Michael A. Glenn; Glenn Patent Group

(57) ABSTRACT

A method is described for optimizing the user-experienced availability and responsiveness of a replicated authentication system via the use of client-side authentication routing logic. Particular techniques are described for maximizing the authentication system availability and additionally either 1) bounding the user-experienced authentication latency, or 2) minimizing the user-experienced authentication latency.

11 Claims, 6 Drawing Sheets

U.S. PATENT DOCUMENTS

| | | | |
|---|---|---|---|
| 6,378,075 B1 | 4/2002 | Goldstein et al. | 713/200 |
| 6,385,615 B1 | 5/2002 | Haeri et al. | 707/10 |
| 6,400,381 B1 | 6/2002 | Barrett et al. | 345/758 |
| 6,446,204 B1* | 9/2002 | Pang et al. | 713/153 |
| 6,658,000 B1* | 12/2003 | Raciborski et al. | 370/386 |
| 6,950,849 B1* | 9/2005 | Brandstatter | 709/203 |

FOREIGN PATENT DOCUMENTS

| | | |
|---|---|---|
| EP | 1 069 726 | 1/2001 |
| EP | 1 126 681 | 8/2001 |
| EP | 1 047 992 | 4/2002 |
| JP | 2001-249901 | 9/2001 |

OTHER PUBLICATIONS

Schneier, Bruce; Applied Cryptography; 1996; John Wiley & Sons, Inc.; 2nd Edition; Chapter 2.*

Dybka et al.; JAVA vs. JavaScript; before Jan. 1, 2002; pp. 1-4; http://www.it.utk.edu/itc/clearinghouse/java/jvsjs.html.*

Peterson et al.; Computer Networks; 1996; Academic Press; 2nd Edition; Chapter 2.*

*Increasing Availability and Security of an Authentication Service*; Li Gong; Jun. 9, 1993.

*A Certificate Path Generation Algorithm for Authenticated Signaling in ATM Networks*; Jun Xu, and Mukesh Singhal.

*Active Networks*; M. Zitterbart, R. Wittmann, B. Metzler, T. Harbaum; Institute of Operating Systems and Compute Networks.

*Session Authentication Protocol for Web Services*; S. Hada, H. Maruyama; Proceedings 2002 Symposium on Applications and the Internet; Jan. 28-Feb. 1, 2002.

*Advances in Cryptology—Eurocrypt 2001; International Conference on the Theory and Application of Cryptographic Techniques*; B. Pfitzmann; May 6-10, 2001.

*SIC DB: Multi-Model Database for Person Authentication*; C. Beumier, and M. Acheroy; Proceedings of ICIAP '99—10th International Conference on Image Analysis and Processing; Sep. 27-29, 1999.

*Trusted Third Party Based Mutual Authentication in UPT System*; Zhu Yujun, Wang Bai, and Chen Junliang; ICCT '98: 1998 International Conference on Communication Technology; Oct. 22-24, 1998.

*Ubiquitous and Robust Authentication Services for Ad Hoc Wireless Networks*; Haiyun Luo, and Songwu Lu; Oct. 2000.

Gong, Li, "Increasing Availability and Security of an Authentication Service"; IEEE Journal on Selected Areas in Communications, vol. 11, No. 5, Jun. 1993, pp. 657-662.

Schneier, Bruce; "Applied Cryptography"; John Wiley & Sons, Inc. 1996, 2nd Edition, Chapter 2.

Peterson,et al.; Computer Networks; Academic Press; 1996, 2nd Edition, Chapter 2.

Dybda et al.; "JAVA vs JavaScript"; Jan. 1, 2002; http://www.it.utk.edu/itc/clearinghouse/java/default.html; pp. 1-4.

* cited by examiner

OPTIMIZING AUTHENTICATION SERVICE AVAILABILITY AND RESPONSIVENESS VIA CLIENT-SIDE ROUTING

BACKGROUND OF THE INVENTION

1. Technical Field

The invention relates generally to user authentication technique in a networked system. More particularly, the invention relates to a system and collection of methods for optimizing the user-experienced availability and responsiveness of a replicated authentication system via the use of client-side authentication routing logic.

2. Description of the Prior Art

As the world has been more networked over the Internet, consumers perform more and more transactions via the World Wide Web. Almost all Web sites providing useful contents or services requires user authentication, which is a process to ensure that a user is who he claims to be. In private and public computer networks including the Internet, authentication is commonly carried out through the use of logon passwords. When the user registers with a network, he declares or is assigned a unique password. On each subsequent use, the user must know and use the password to access the network. The user's knowledge of the password is assumed to guarantee that he is authentic.

When user authentication is required, a Web server redirects the user to a logon page. A logon usually requires that the user have a user ID and a password. Often, the user ID must conform to a limited length such as eight characters and the password must contain, for example at least one digit, and not match a natural language word. The user ID can be freely known and is visible when entered at a keyboard or other input device. The password must be kept secret and is not displayed as it is entered.

In the logon process, the user enters his user ID and password. The authentication server compares the user's authentication credentials with other user credentials stored in a database. If the credentials match, the user is granted access to the network. If the credentials are at variance, authentication fails and network access is denied.

There are two major concerns regarding to an authentication service. The first one is security and the second one is availability. In the security concern, the authentication service should provide trustworthy authentication results and be hard for invaders to break through. While in the availability concern, the authentication service should remain available in a pre-determined time frame, which often requires 24×7 coverage.

The security concern has drawn most of the attention and a great number of techniques have been devoted to this area. Cryptography has been introduced to encrypt the users' secret passwords to prevent steal of passwords by unauthorized person. Even in the case that the authentication server is invaded, the invader can only get the encrypted passwords and it is often hard if not impossible to retrieve the user's secret password. For example, Matyas et al. in U.S. Pat. No. 4,218,738 disclosed a secure hardware for cryptographically generating a verification pattern which is a function of a potential computer user's identity number, the potential computer user's separately entered password, and a stored test pattern. The secure hardware was also provided for generating verification patterns during authentication processing and for generating test patterns during the secure run. The secure hardware used a variation of the host computer master key to reduce risk of compromising of total system security.

To meet the availability concern, one authentication server is often replicated one or more times, so that a pool of authentication servers can all provide the authentication service. Unless all authentication servers of the pool are all unavailable at the same time, the authentication service is always available. Although the replication approach provides the necessary availability coverage, it also introduces issues like data propagation because user authentication information needs to be propagated accurately and rapidly among participating authentication servers. In addition, the security of the whole authentication system becomes lower as authentication servers increase in number and become more distributed. In the article entitled "Increasing Availability and Security of an Authentication Service" published on Jun. 9, 1993, Li Gong proposed a general solution by replicating the authentication server in such a way that multiple servers share the responsibility of providing the authentication service and a minority of compromised servers cannot compromise the service through malicious behavior and collusion. An authentication protocol is developed using secret-sharing techniques and a cross-checksum scheme so that a set of servers provide a distributed authentication service while each server providing only a fraction of the authentication. The protocol has a configurable threshold number which can explore the trade-off between availability and security when adjusted.

In the situation where a pool of authentication servers is used, an efficient technique for routing the authentication request to the available ones among the replicated authentication servers becomes significant. For example, in order to provide higher available authentication server, a secondary authentication server is often needed to back up a first authentication server, which is also referred to the primary authentication server. The secondary authentication server is used when the primary authentication server is temporarily unavailable.

It is often desired to minimize the probability that a Web user authentication request is submitted to a temporarily unavailable or slow-to-respond primary authentication server, such that a secondary authentication server can be maximally leveraged for higher overall Web authentication service availability. Additionally, it is desired in this situation to avoid submitting any Web authentication requests to the primary authentication server when it is unavailable or slow-to-respond, because this will cause a bad user experience such as the user receiving an error page after the request to the primary authentication server times out.

One typical approach to solving this availability problem is to employ an authentication routing server in front of the primary and secondary authentication servers. User authentication requests are submitted to this routing server instead of directly to the primary or secondary authentication server, and the routing server forwards the request on to the primary authentication server or the secondary authentication server depending on the current value of an availability flag that the routing server maintains. The routing server periodically checks the availability of the primary authentication server at some predetermined frequency, say once per minute, and updates the availability flag when the primary server goes from available to not-available and vice-versa. When the availability flag indicates primary authentication server is available, authentication requests are submitted to primary authentication server, otherwise authentication requests are submitted to the secondary authentication server.

There are several shortcomings with this approach. For example, the availability of the primary authentication server may be partial and thus dependent on the particular user being authenticated, hence a single availability flag is too coarse. Secondly and most importantly, the routing server itself becomes a single point of failure in this architecture, since all user authentication requests go through it before getting to the primary or secondary authentication servers.

What is desired is a technique for enabling dynamic client-side authentication routing such that secondary, tertiary, etc. replicated authentication servers can be maximally leveraged to optimize the user-experienced availability and responsiveness of the authentication system.

SUMMARY OF THE INVENTION

A method is described for optimizing the user-experienced availability and responsiveness of a replicated authentication system via the use of client-side routing logic. Particular techniques are described for maximizing the authentication system availability and additionally either 1) bounding the user-experienced authentication latency, or 2) minimizing the user-experienced authentication latency.

In one preferred embodiment of the invention, a method is disclosed for providing authentication services for a user using a plurality of authentication servers, comprising the steps of:
 routing authentication submissions among the plurality of authentication servers using a client-side routing module;
 minimizing the probability that the user's authentication request is submitted to an unavailable authentication server among the plurality of authentication servers; and
 providing higher Web authentication service availability by leveraging the plurality of authentication servers.

In another preferred embodiment of the invention, a method is disclosed for authenticating a user to a primary authentication server (S1) or a secondary authentication server (S2) with pre-submission test authentication. S2 is used when S1 is unavailable. The method comprises the following steps:
 fetching a login page from a Web server, the login page containing a login form and a routing module;
 submitting a login request with an identifier of the user and an associated password from a Web browsing device; and
 the Web browsing device invoking the routing module to determine routing by performing test authentication.

In another equally preferred embodiment of the invention, a Web authentication apparatus is disclosed. The apparatus comprises a primary authentication server, a secondary authentication server to be used when the primary authentication server is unavailable, and a Web browsing device executing a runtime pre-submission routing module. The routing module comprises a means to request a login test image from the primary authentication server.

In another equally preferred embodiment of the invention, a method is disclosed for authenticating a user to a primary authentication server (S1) with automatic submission to a secondary authentication server (S2) if the response from S1 is not received by the browsing device within a bounded time period. The method comprises the following steps:
 fetching a login page from a Web server, the login page containing a login form and a routing module;
 submitting a login request to S1 with an identifier of the user and an associated password from a Web browsing device; and
 the Web browsing device invoking the routing module to automatically submit the login request to S2 if a response from S1 is not received within a bounded time period.
 the Web browsing device invoking the routing module to detect and process the first response received from either S1 or S2 so as to achieve the best possible response time.

In another equally preferred embodiment of the invention, a method is disclosed for authenticating a user to a plurality of authentication servers (S1, S2, . . . , Sn) with concurrent submission to achieve minimum possible response time. The method comprises the following steps:
 fetching a login page from a Web server, the login page containing a login form and a routing module;
 submitting concurrent login requests to each of S1, S2, . . . , Sn containing an identifier of the user and an associated password from a Web browsing device; and
 the Web browsing device invoking the routing module to detect and process the first response received from one of S1, S2, . . . , Sn so as to achieve the best possible response time.

DETAILED DESCRIPTION OF THE INVENTION

In the following detailed description of the invention, some specific details are set forth to provide a thorough understanding of the presently preferred embodiment of the invention. However, it will be apparent to those skilled in the art that the invention may be practiced in embodiments that do not use the specific details set forth herein. Well known methods, procedures, components, and circuitry have not been described in detail.

Figure 1:
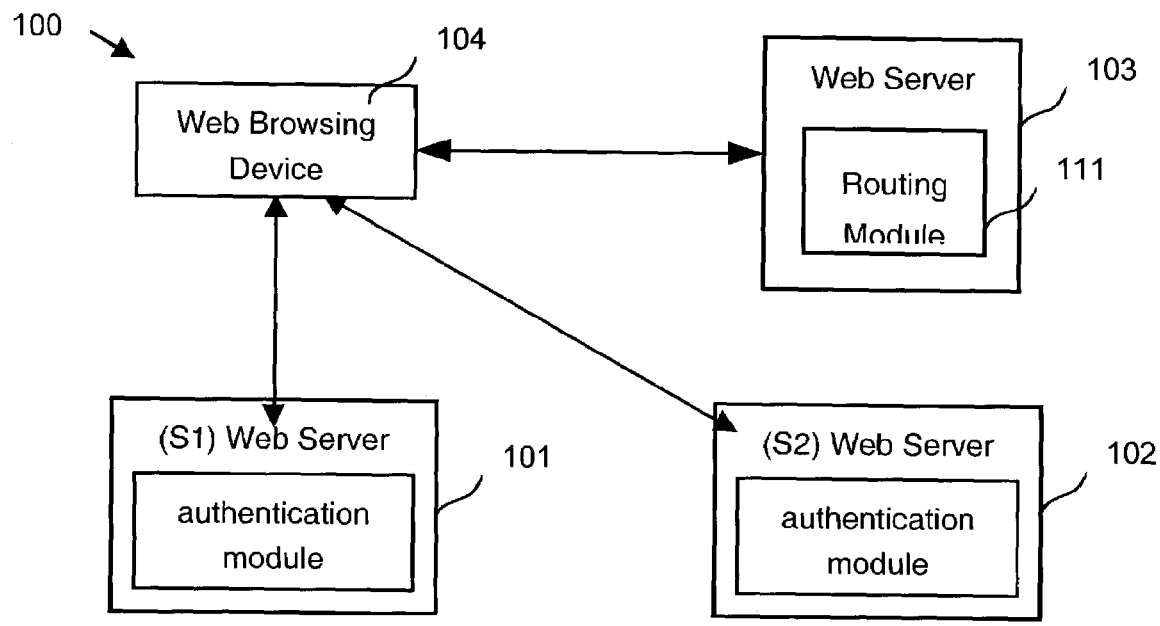
FIG. 1 is a block diagram illustrating a communications network 100 for Web user authentication according to the invention.

FIG. 1 is a block diagram illustrating a communications network 100 for Web user authentication. The communications network comprises a primary authentication server (S1) 101, a secondary authentication server (S2) 102, a Web server 103 providing Web contents, and a Web browsing device 104 requesting Web contents from the Web server 103. The Web server 103 comprises a web login page, which contains a runtime authentication routing module 111. The authentication routing module is returned along with the Web login page to the Web browsing device 104 for use in client-side routing. The authentication servers are themselves web servers that contain authentication modules deployed to provide authentication service. The Web login page is served by a separate Web server 103 as shown in the diagram. However, it can be also served by the primary authentication server S1 and/or the secondary authentication server S2 instead since both are also web servers.

When a user connects to the Web server using the Web browsing device, a Web login page is returned from the Web server to the user when authentication is needed. The Web login page includes the runtime authentication routing module 111.

The routing module 111 comprises client side script code, which is typically Javascript.

Figure 2:
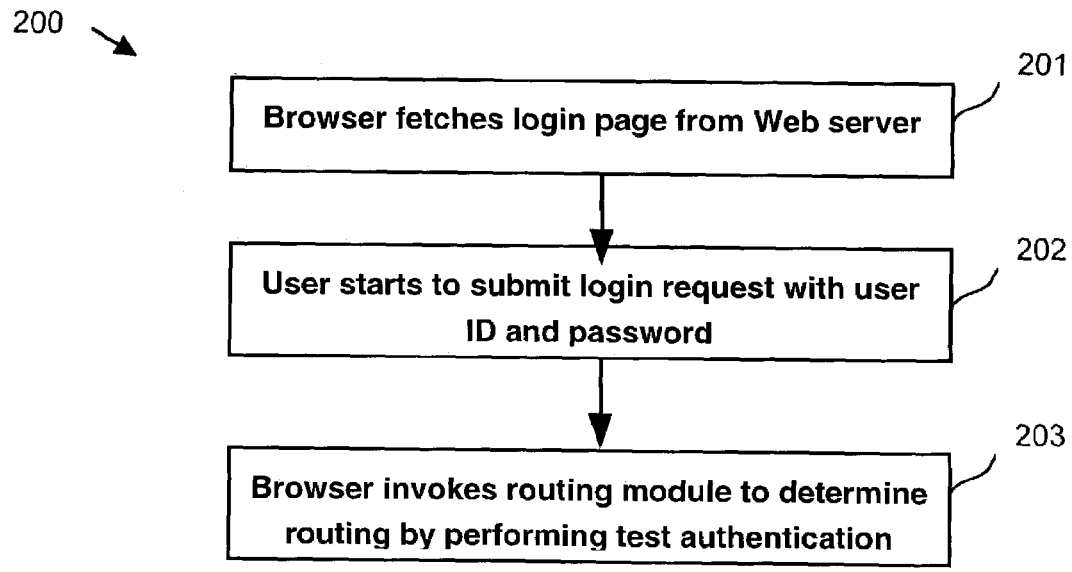
FIG. 2 is a flow diagram illustrating a method 200 for authenticating a user to a primary authentication server (S1) or a secondary authentication server (S2) with pre-submission test authentication.

FIG. 2 is a flow diagram illustrating a method 200 for authenticating a user to a primary authentication server (S1) or a secondary authentication server (S2) with pre-submission test authentication. S2 is used when S1 is unavailable. The method comprises the following steps:

Step 201: fetching a login page from a Web server, the login page containing a login form and a routing module;

Step 202: submitting a login request with an identifier of the user and an associated password from a Web browsing device; and Step 203: the Web browsing device invoking the routing module to determine routing by performing test authentication.

Figure 3:
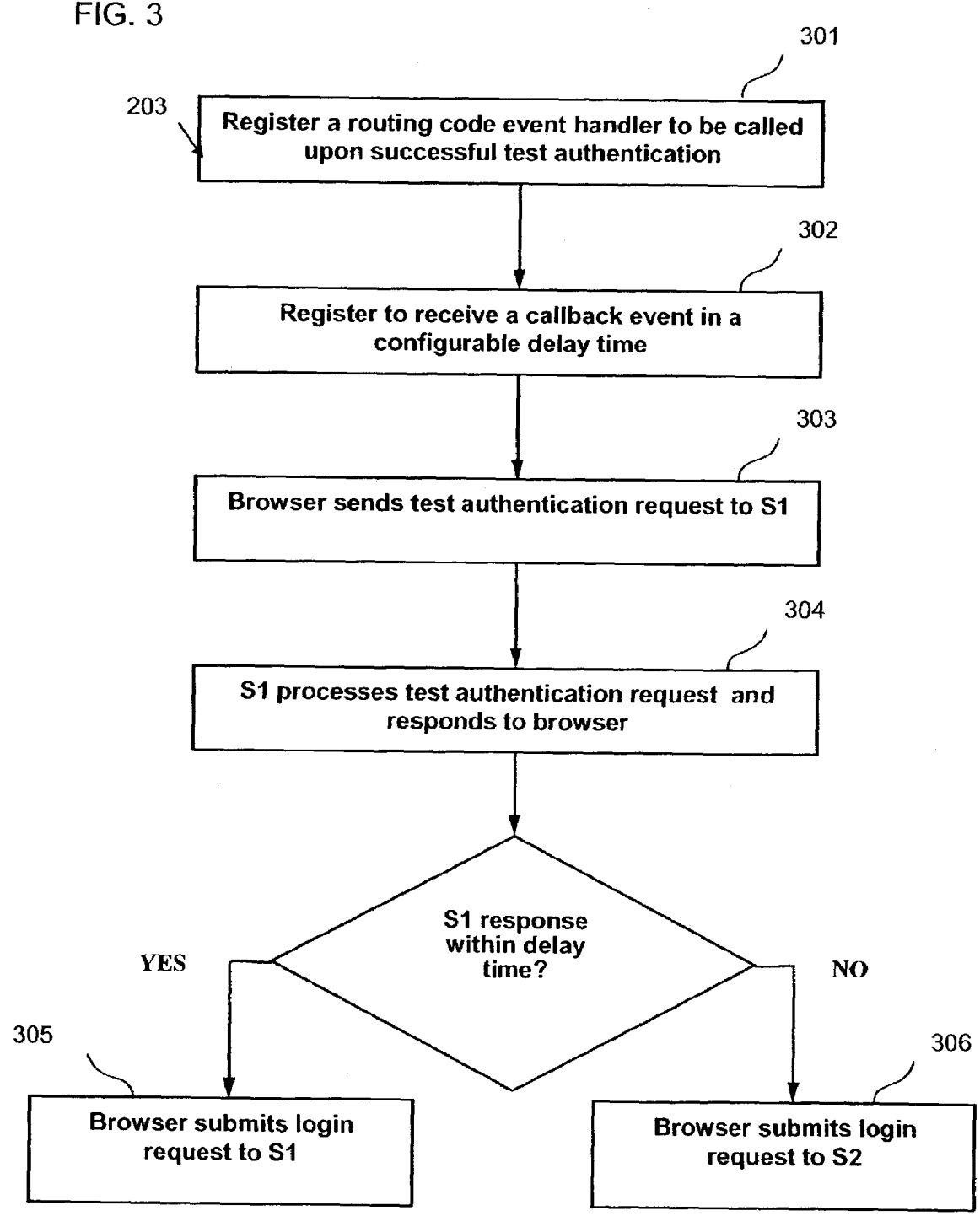
FIG. 3 is a flow diagram illustrating details of step 203 of method 200.

FIG. 3 is a flow diagram illustrating details of step 203 of method 200. Step 203 further comprises the following sub-steps:

Step 301: registering a routing code event handler to be called upon successful test authentication;

Step 302: registering a callback event in a configurable delay time, typically in the scale of milliseconds;

Step 303: sending a test authentication request to the primary authentication server without submitting the login form or leaving the login page;

Step 304: processing the test authentication request and sending response to the Web browsing device by the primary authentication server;

Step 305: if a successful response to the test authentication request is received from the primary authentication server within the delay time, the Web browsing device submitting the login form to the primary authentication server; and Step 306: otherwise the Web browsing device submitting the login form to the secondary authentication server.

In a typical embodiment, the primary server returns a small image to indicate a successful response, and the Web browsing device determines that the primary authentication server returns a successful response when loading of the image is detected.

An example implementation in HTML and Javascript of the methods illustrated in FIGS. 2–3 is provided below:

```
<!-- Sample HTML/Javascript Implementing Logic in FIGS. 2 and 3 -->
<html>
<head>
    <title>Sample HTML/Javascript Implementing Logic
    in FIGS. 2 and 3</title>
<!-- The following Javascript code comprises the routing module -->
```

-continued

```
<script>
var maxWaitMillis = 500;
var startWait;
var done = false;
var s1AuthUrl = "<S1's authentication URL>";
var s2AuthUrl = "<S2's authentication URL>";
// Step 202
function doSubmit( ) {
    done = false;
    // Step 301
    document.img.onload = s1TestAuthSucceeded;
    document.img.onerror= s1TestAuthFailed;
    // Step 302
    setTimeout("timedOut( );", maxWaitMillis);
    // Step 303
    var s1Url = s1AuthUrl + "&id=" + document.loginForm.id.value +
"&testauth=yes";
    document.img.src = s1Url;
    return false;
}
function timedOut( ) {
    if (!done) {
        s1TestAuthFailed( );
    }
}
// Step 305
function s1TestAuthSucceeded( ) {
    if (!done) {
        done = true;
        var s1Url = s1AuthUrl + "&id=" +
        document.loginForm.id.value + "&pwd=" +
document.loginForm.pwd.value;
        document.loginForm.action = s1Url;
        document.loginForm.submit( );
    }
}
// Step 306
function s1TestAuthFailed( ) {
    if (!done) {
        done = true;
        var s2Url = s2AuthUrl + "&id=" +
        document.loginForm.id.value + "&pwd=" +
document.loginForm.pwd.value;
        document.loginForm.action = s2Url;
        document.loginForm.submit( );
    }
}
</script>
</head>
<body bgcolor="#ffffff">
<form name="loginForm" method="post">
    <p><strong>Sample HTML/Javascript Implementing
    Logic in FIGS. 2 and 3
</strong></p>
        <table border="0">
            <tr>
                <td valign="top">Login id:</td>
                <td valign="top"><input name="id" type="text"
size="20"></td>
            </tr>
            <tr>
                <td valign="top">Password</td>
                <td valign="top"><input name="pwd"
                type="password"
size="20"></td>
            </tr>
            <tr>
                <td valign="top"> </td>
                <td valign="top"><input type="submit"
                name="B1"
value="Submit" onclick="doSubmit( ); return false;"></td>
            </tr>
        </table>
</form>
<img width=1 height=1 src="invisible.gif" name="img">
</body>
</html>
```

The above method can also be extended to a plurality of backup authentication servers chained one after another with one authentication server backing up the previous authentication server.

In another equally preferred embodiment, the Web browsing device passes the identifier of the user along with the test authentication request to the primary authentication server to perform test authentication that is user specific.

Figure 4:
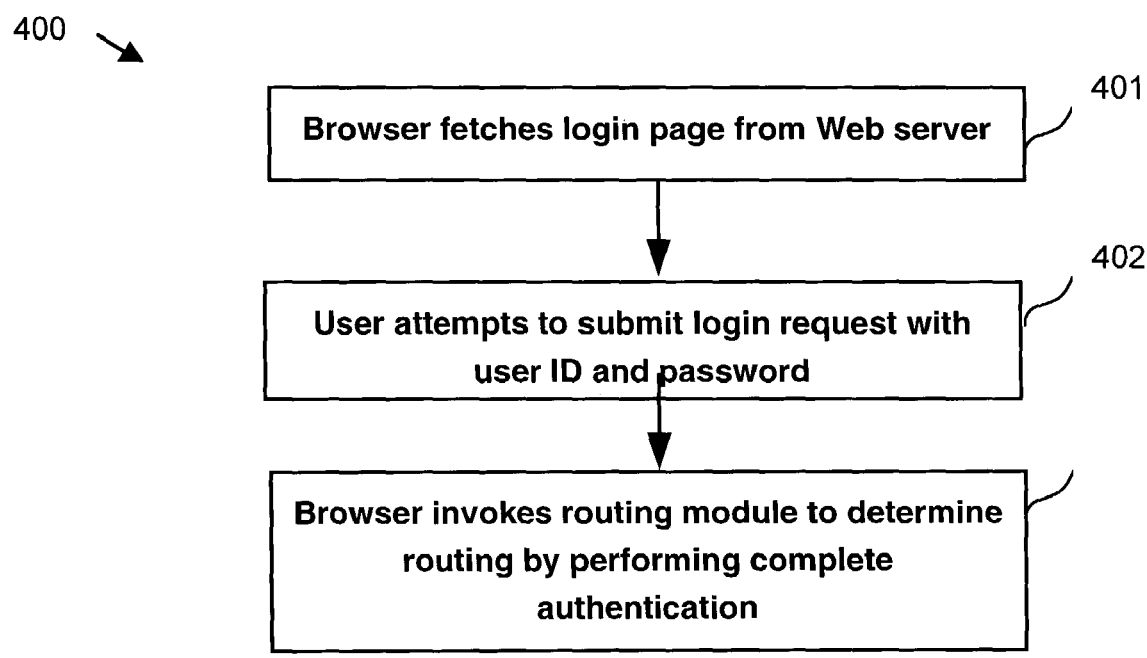
FIG. 4 is a flow diagram illustrating a method 400 for authenticating a user to a primary authentication server (S1) with automatic submission to a secondary authentication server (S2) if the response from S1 is not received by the browsing device within a bounded time period.

FIG. 4 is a flow diagram illustrating a method 400 for authenticating a user to a primary authentication server (S1) with automatic submission to a secondary authentication server (S2) if the response from S1 is not received by the browsing device within a bounded time period. The method comprises the following steps:

Step 401: fetching a login page from a Web server, the login page containing a login form and a routing module;

Step 402: submitting a login request with an identifier of the user and an associated password from a Web browsing device; and Step 403: the Web browsing device invoking the routing module to determine routing by performing complete authentication.

Figure 5:
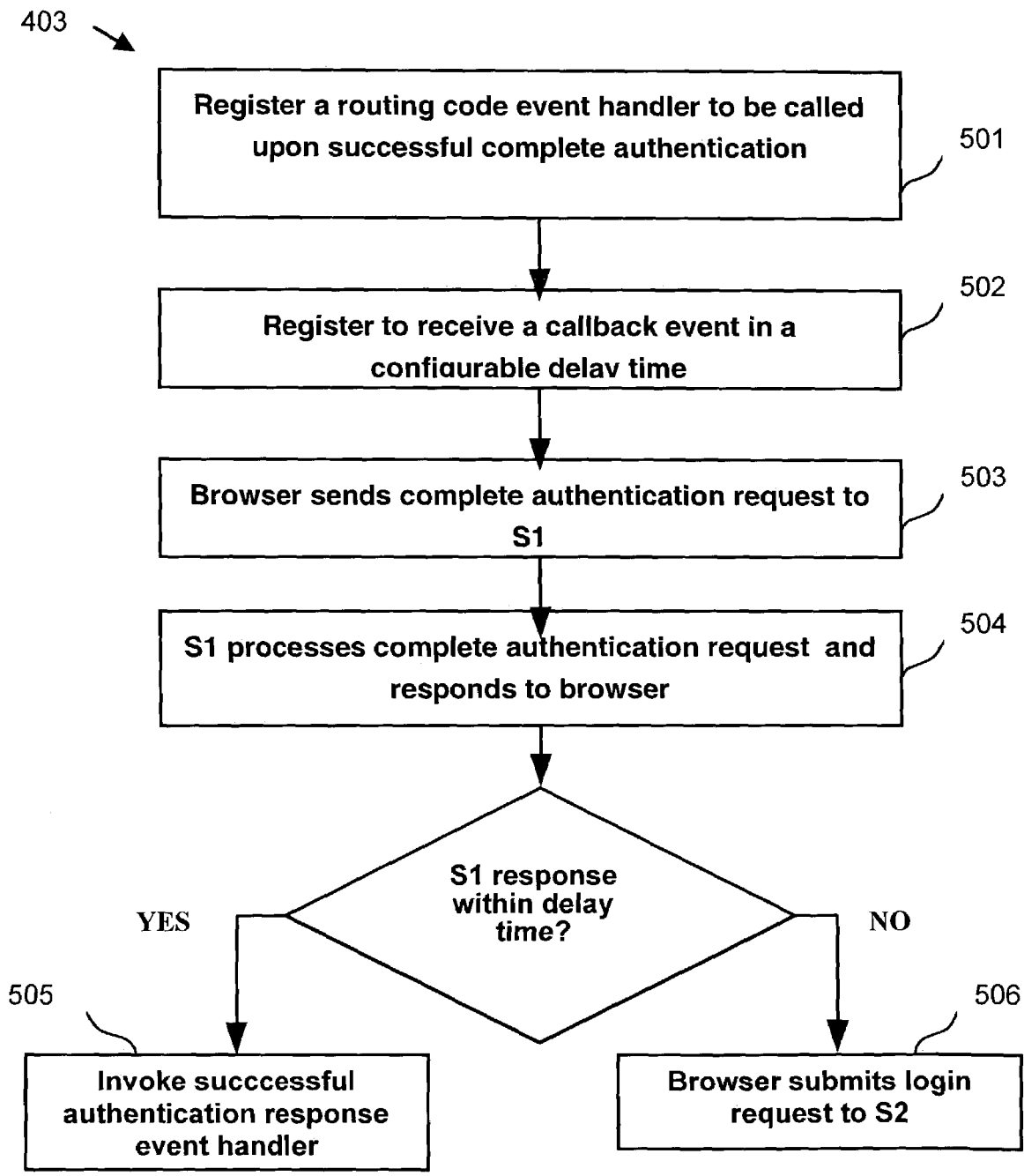
FIG. 5 is a flow diagram illustrating details of step 403 of method 400.

FIG. 5 is a flow diagram illustrating details of step 403 of method 400. Step 403 further comprises the following sub-steps:

Step 501: registering a routing code event handler to be called upon successful complete authentication;

Step 502: registering a callback event in a configurable delay time, typically in the scale of milliseconds;

Step 503: sending a complete authentication request to the primary authentication server without submitting the login form or leaving the login page;

Step 504: processing the complete authentication request and sending response to the Web browsing device by the primary authentication server;

Step 505: if a response to the complete authentication request is received from the primary authentication server within the delay time, the Web browsing device invoking a successful response event handler to process the response; and Step 506: otherwise the Web browsing device submitting the login form to the secondary authentication server.

In a typical embodiment, the primary server returns a small image and one or more cookies. The cookies are used to store authentication results. One of the cookies may explicitly state whether the complete authentication request is successful.

Figure 6:
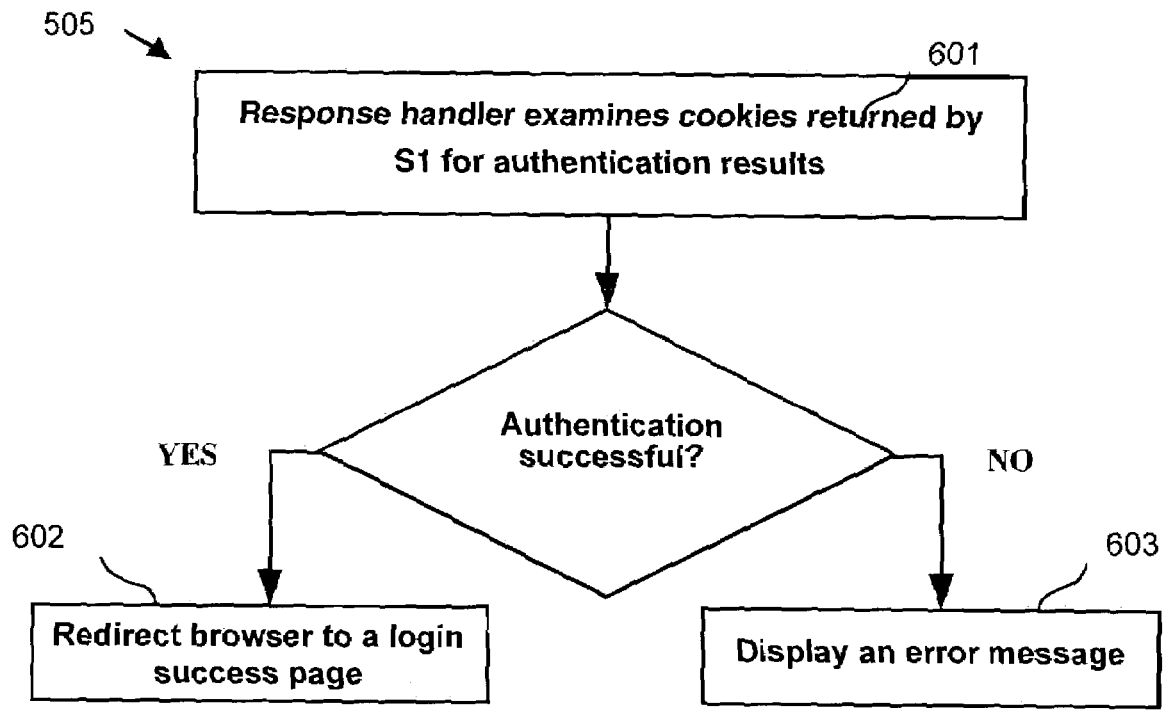
FIG. 6 is a flow diagram illustrating details of sub-step 505 of step 403 of method 400.

FIG. 6 is a flow diagram illustrating details of sub-step 505 of step 403 of method 400. Sub-step 505 further comprises the following sub-steps:

Step 601: the response handler examining the cookies to determine authentication results;

Step 602: redirecting the Web browsing device to a login successful page if the authentication is successful; and Step 603: the Web browsing device displaying an error message otherwise.

The method 400 can also be extended to a plurality of backup authentication servers can be chained one after another with one authentication server backing up the previous authentication server.

An example implementation in HTML and Javascript of the methods illustrated in FIGS. 4–6 is provided below:

```
<!-- Sample HTML/Javascript Implementing Logic in FIGS. 4-6 -->
<html>
<head>
    <title>Sample HTML/Javascript Implementing Logic
    in FIGS. 4-6</title>
<!-- The following Javascript code comprises the routing module -->
<script>
var maxWaitMillis = 500;
var startWait;
var done = false;
var s1AuthUrl = "<S1's authentication URL>";
var s2AuthUrl = "<S2's authentication URL>";
var s1PostAuthUrl = "<S1's post-authentication URL>";
// Step 402
function doSubmit( ) {
    done = false;
    // Step 501
    document.img.onload = s1AuthCompleted;
    document.img.onerror= s1AuthDidntComplete;
    // Step 502
    setTimeout("timedOut( );", maxWaitMillis);
    // Step 503
    var s1Url = s1AuthUrl + "&id=" + document.loginForm.id.value +
    "&pwd=" +
document.loginForm.pwd.value;
    document.img.src = s1Url;
    return false;
}
function timedOut( ) {
    if (!done) {
        s1AuthDidntComplete( );
    }
}
// Step 505
function s1AuthCompleted( ) {
    if (!done) {
        done = true;
        // Step 601
        var authSuccess =
        (document.cookie.indexOf("AUTH_RESULT=good") >= 0);
        if (authSuccess) {
            // Step 602
            // Redirect to S1's post-login page
            document.location = s1PostAuthUrl;
        } else {
            // Step 603
            // Display error message and let user try again
            alert("Invalid login attempt. Please try again.");
        }
    }
}
// Step 506
function s1AuthDidntComplete( ) {
    if (!done) {
        done = true;
        var s2Url = s2AuthUrl + "&id=" +
        document.loginForm.id.value +
        "&pwd=" +
document.loginForm.pwd.value;
        document.loginForm.action = s2Url;
        document.loginForm.submit( );
    }
}
</script>
</head>
<body bgcolor="#ffffff">
<form name="loginForm" method="post">
    <p><strong>Sample HTML/Javascript
    Implementing Logic in FIGS. 4-6
</strong></p>
    <table border="0">
        <tr>
            <td valign="top">Login id:</td>
            <td valign="top"><input name="id" type="text"
size="20"></td>
        </tr>
```

-continued

```
            <tr>
                <td valign="top">Password</td>
                <td valign="top"><input name="pwd"
                       type="password"
size="20"></td>
            </tr>
            <tr>
                <td valign="top"> </td>
                <td valign="top"><input type="submit" name="B1"
value="Submit" onclick="doSubmit( ); return false;"></td>
            </tr>
        </table>
    </form>
    <img width=1 height=1 src="invisible.gif" name="img">
</body>
</html>
```

Figure 7:
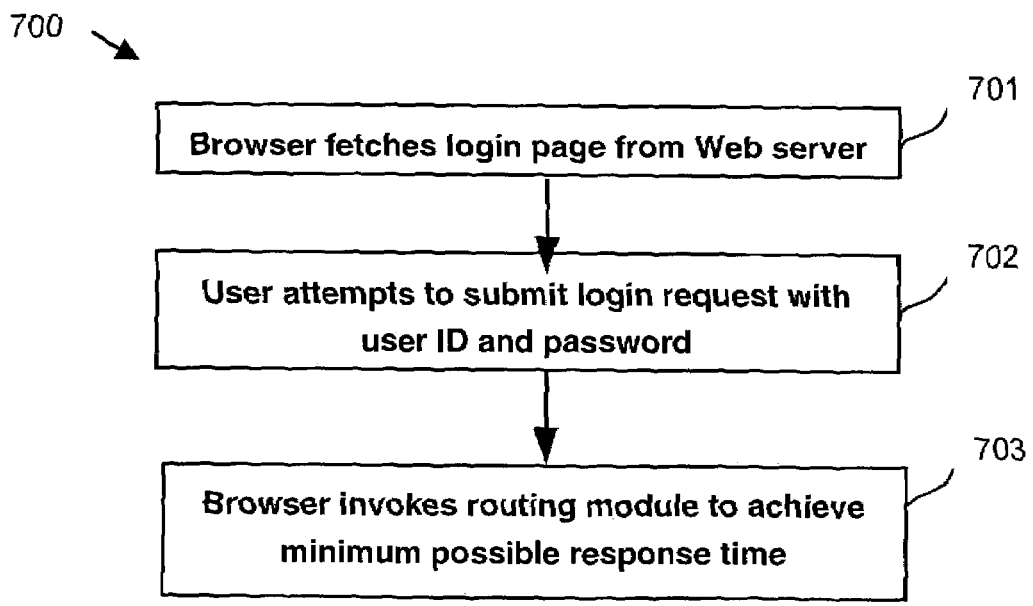
FIG. 7 is a flow diagram illustrating a method 700 for authenticating a user to a plurality of authentication servers (S1, S2, . . . , Sn) with concurrent submission to achieve minimum possible response time.

FIG. 7 is a flow diagram illustrating a method 700 for authenticating a user to a plurality of authentication servers (S1, S2, . . . , Sn) with concurrent submission to achieve minimum possible response time. The method comprises the following steps:

Step 701: fetching a login page from a Web server, the login page containing a login form and a routing module;

Step 702: submitting a login request with an identifier of the user and an associated password from a Web browsing device; and Step 703: the Web browsing device invoking the routing module to achieve best possible response time by submitting concurrent complete authentication.

Figure 8:
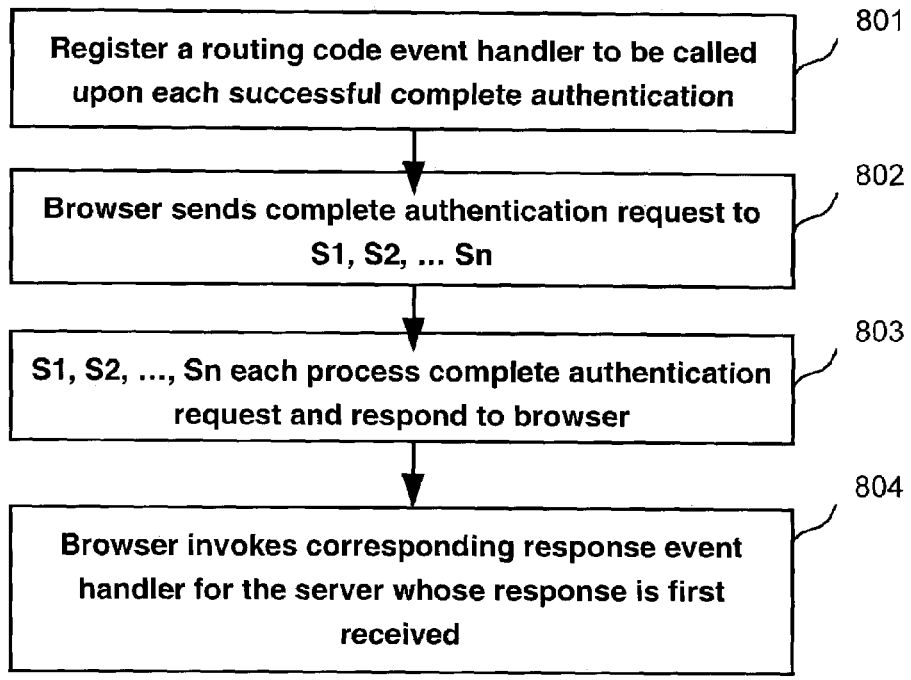
FIG. 8 is a flow diagram illustrating details of step 703 of method 700.

FIG. 8 is a flow diagram illustrating details of step 703 of method 700. Step 703 further comprises the following sub-steps:

Step 801: registering a routing code event handler to be called upon receiving authentication response from each of the authentication servers;

Step 802: sending a plurality of complete authentication requests, one to each of the authentication servers, without submitting the login form or leaving the login page;

Step 803: processing the complete authentication request and sending response to the Web browsing device by each of the authentication servers; and Step 804: upon receiving a first authentication response from an authentication server, the Web browsing device invoking a response event handler for the authentication server whose response is first received.

In a typical embodiment, the primary server returns a small image and one or more cookies. The cookies are used to store authentication results. Each of the authentication servers prepends a server identifier to names of the cookies to avoid overwriting each other's cookies.

Figure 9:
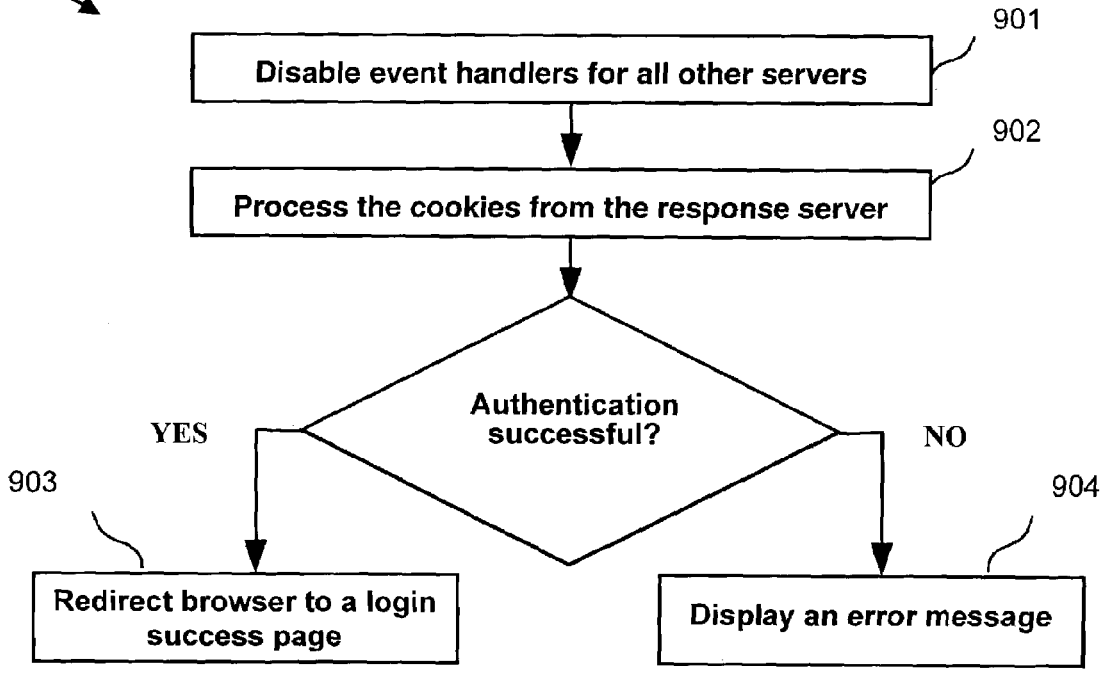
FIG. 9 is a flow diagram illustrating details of sub-step 804 of step 703 of method 700.

FIG. 9 is a flow diagram illustrating details of sub-step 804 of step 703 of method 700. Sub-step 804 further comprises the following sub-steps:

Step 901: disabling event handler for other authentication servers;

Step 902: processing the cookies from the first response authentication server to determine authentication result;

Step 903: redirecting the Web browsing device to a login successful page if the authentication is successful; and Step 904: the Web browsing device displaying an error message otherwise.

An example implementation in HTML and Javascript of the methods illustrated in FIGS. 7–9 is provided below:

```
<!-- Sample HTML/Javascript Implementing Logic in FIGS. 7–9 -->
<html>
<head>
    <title>Sample HTML/Javascript Implementing
        Logic in FIGS. 7–9</title>
<!-- The following Javascript code comprises the routing module -->
<script>
var done = false;
var authUrls = new Object( );
authUrls["s1"] = "<S1's authentication URL>";
authUrls["s2"] = "<S2's authentication URL>";
//...
authUrls["sn"] = "<Sn's authentication URL>";
var postAuthUrls = new Object( );
postAuthUrls["s1"] = "<S1's post-authentication URL>";
postAuthUrls["s2"] = "<S2's post-authentication URL>";
//...
postAuthUrls["sn"] = "<Sn's post-authentication URL>";
// Step 702
function doSubmit( ) {
    done = false;
    // Step 801
    document.img1.onload = s1AuthCompleted;
    document.img2.onload = s2AuthCompleted;
    //...
    document.imgn.onload = snAuthCompleted;
    // Step 803
    var query = "&id=" + document.loginForm.id.value + "&pwd=" +
document.loginForm.pwd.value;
    document.img1.src = authUrls["s1"] + query;
    document.img2.src = authUrls["s2"] + query;
    //...
    document.imgn.src = authUrls["sn"] + query;
    return false;
}
// Step 805
function s1AuthCompleted( ) {
    return authCompleted("s1");
}
function s2AuthCompleted( ) {
    return authCompleted("s2");
}
//...
function snAuthCompleted( ) {
    return authCompleted("sn");
}
function authCompleted(serverId) {
    if (!done) {
        // Step 901
        done = true;
        // Step 902
        var cookieName = "AUTH_RESULT." + serverId;
        var authSuccess =
            (document.cookie.indexOf(cookieName + "=good") >= 0);
        if (authSuccess) {
            // Step 903
            // Redirect to server's post-login page
            document.location = postAuthUrls[serverId];
        } else {
            // Step 904
            // Display error message and let user try again
            alert("Invalid login attempt. Please try again.");
        }
    }
}
</script>
</head>
<body bgcolor="#ffffff">
<form name="loginForm" method="post">
    <p><strong>Sample HTML/Javascript Implementing
        Logic in FIGS. 7–9
</strong></p>
    <table border="0">
        <tr>
            <td valign="top">Login id:</td>
            <td valign="top"><input name="id" type="text"
size="20"></td>
        </tr>
        <tr>
```

-continued

```
                <td valign="top">Password</td>
                <td valign="top"><input name="pwd"
                        type="password"
size="20"></td>
            </tr>
            <tr>
                <td valign="top"> </td>
                <td valign="top"><input type="submit"
                        name="B1"
value="Submit" onclick="doSubmit( ); return false;"></td>
            </tr>
    </table>
</form>
<img width=1 height=1 src="invisible.gif" name="img1">
<img width=1 height=1 src="invisible.gif" name="img2">
...
<img width=1 height=1 src="invisible.gif" name="imgn">
</body>
</html>
```

Although the invention is described herein with reference to the preferred embodiment, one skilled in the art will readily appreciate that other applications may be substituted for those set forth herein without departing from the spirit and scope of the present invention.

Accordingly, the invention should only be limited by the Claims included below.

The invention claimed is:

1. A method for authenticating a user to a primary authentication server or a secondary authentication server with pre-submission test authentication, said secondary authentication server is used when said primary authentication server is unavailable, comprising the steps of:
a Web browsing device fetching a login page from a Web server, said login page containing a login form and a routing module;
submitting a login request with an identifier of said user and an associated password from said Web browsing device; and
said Web browsing device invoking said routing module to determine routing by performing said pre-submission test authentication with the following sub-steps:
registering a routing code event handler to be called upon successful pre-submission test authentication;
registering a callback event in a configurable delay time;
sending said pre-submission test authentication request to said primary authentication server without submitting said login form or leaving said login page;
processing said pre-submission test authentication request and sending response to said Web browsing device by said primary authentication server;
if a successful response to said pre-submission test authentication request is received from said primary authentication server within said delay time, said Web browsing device submitting said login form to said primary authentication server; and
otherwise said Web browsing device submitting said login form to said secondary authentication server.

2. The method of claim 1, wherein said pre-submission test authentication request is for an image and the primary authentication server returns a small image to indicate a successful response.

3. The method of claim 2, wherein said Web browsing device determines that said primary authentication server returns a successful response when loading of said image is detected.

4. The method of claim 1, wherein a plurality of backup authentication servers can be chained one after another with one authentication server backing up the previous authentication server.

5. The method of claim 1, wherein said Web browsing device does not pass said identifier of said user along with pre-submission test authentication request to said primary authentication server to perform pre-submission test authentication that is not user specific.

6. The method of claim 1, wherein said Web browsing device passes said identifier of said user along with said pre-submission test authentication request to said primary authentication server to perform pre-submission test authentication that is user specific.

7. A method for authenticating a user to a primary authentication server with automatic submission to a secondary authentication server, said secondary authentication server is used when said primary authentication server is unavailable or slow to respond, comprising the steps of:
a Web browsing device fetching a login page from a Web server, said login page containing a login form and a runtime pre-submission routing module;
submitting a login request with an identifier of said user and an associated password from said Web browsing device; and
said Web browsing device invoking said runtime pre-submission routing module to determine routing by performing complete authentication with the following sub-steps:
registering a routing code event handler to be called upon successful test authentication;
registering a callback event in a configurable delay time;
sending a complete authentication request to said primary authentication server without submitting said login form or leaving said login page;
processing said complete authentication request and sending response to said Web browsing device by said primary authentication server;
if a response to said complete authentication request is received from said primary authentication server within said delay time, said Web browsing device invoking a successful response event handler to process said response; and
otherwise said Web browsing device submitting said login form to said secondary authentication server.

8. The method of claim 7, wherein said primary authentication server returns a small image and one or more cookies, said cookies containing authentication results.

9. The method of claim 8, wherein one of said cookies explicitly states whether said complete authentication request is successful.

10. The method of claim 9, further comprising the steps of:
said response handler examining said cookies to determine authentication results;
redirecting said Web browsing device to a login successful page if said authentication is successful; and
said Web browsing device display an error message otherwise.

11. The method of claim 7, wherein a plurality of backup authentication servers can be chained one after another with one authentication server backing up the previous authentication server.

* * * * *